United States Patent [19]

Hardison

[11] Patent Number: 5,126,118
[45] Date of Patent: Jun. 30, 1992

[54] PROCESS AND APPARATUS FOR REMOVAL OF H₂S WITH SEPARATE ABSORBER AND OXIDIZER AND A REACTION CHAMBER THEREBETWEEN

[75] Inventor: Leslie C. Hardison, Barrington, Ill.

[73] Assignee: ARI Technologies, Inc., Palatine, Ill.

[21] Appl. No.: 682,592

[22] Filed: Apr. 8, 1991

[51] Int. Cl.⁵ ............................................. C01B 17/16
[52] U.S. Cl. ................................. 423/220; 423/230; 423/231; 423/573.1; 423/191
[58] Field of Search ............... 423/576.2, 576.4, 576.5, 423/576.6, 576.8, 573.1, DIG. 14, 220, 230, 231, 191; 422/193, 194, 169

[56] References Cited

U.S. PATENT DOCUMENTS

| | | | |
|---|---|---|---|
| 2,142,406 | 1/1939 | Nonhebel et al. | 422/169 |
| 3,638,708 | 2/1972 | Farin | 159/47 WL |
| 3,759,669 | 9/1973 | Aaron et al. | 422/231 |
| 3,876,537 | 4/1975 | Dulin et al. | 210/15 |
| 3,887,682 | 6/1975 | Kumata et al. | 423/232 |
| 4,009,251 | 2/1977 | Meuly | 423/573 G |
| 4,083,944 | 4/1978 | Chalmers | 423/567 A |
| 4,225,562 | 9/1980 | Anderson | 422/188 |
| 4,236,974 | 12/1980 | Kuhnlein | 203/11 |
| 4,238,462 | 12/1980 | Hardison | 423/224 |
| 4,375,450 | 3/1983 | Katagiri et al. | 422/170 |
| 4,482,524 | 11/1984 | Hardison | 422/170 |
| 4,622,212 | 11/1986 | McManus et al. | 423/226 |
| 4,741,888 | 5/1988 | Fong et al. | 423/226 |
| 4,844,881 | 7/1989 | Gens et al. | 423/574 R |
| 4,855,124 | 8/1989 | Matsuoka et al. | 423/547 L |
| 4,935,221 | 6/1990 | Bronfenbrenner et al. | 423/574 |
| 4,976,935 | 12/1990 | Lynn | 423/222 |

FOREIGN PATENT DOCUMENTS

| | | | |
|---|---|---|---|
| 5439383 | 3/1979 | Japan | 422/194 |
| 1298861 | 12/1972 | United Kingdom | 423/567 A |

OTHER PUBLICATIONS

Leslie C. Hardison, "Hydrogen Sulfide: An Alternative To Claus", Chemical Engineering, Jan. 21, 1985.

Primary Examiner—Gary P. Straub
Assistant Examiner—Timothy C. Vanoy
Attorney, Agent, or Firm—Marshall, O'Toole, Gerstein, Murray & Bicknell

[57] ABSTRACT

A method and apparatus including a reaction chamber interposed in a polyvalent metal redox solution flow path between an absorber chamber and an oxygenation chamber, including one or more oxygenation stages, for contact in the reaction chamber of H₂S-laden catalytic polyvalent metal redox solution form the absorber chamber with highly oxidized polyvalent metal redox solution from the last oxygenation stage to accomplish oxidation of the dissolved H₂S species by interaction with the oxidized redox catalyst essentially in the absence of gaseous dissolved oxygen. The highly oxidized polyvalent metal redox solution, including $Fe^{+3}$ or $V^{+5}$, contacts the H₂S-laden solution from the absorber chamber for reoxidation of the dissolved $HS^-$, $S^=$ and any of the polyvalent metal sulfur compounds (presumably a chelated iron sulfide or a vanadium sulfide), to avoid formation of sulfate or thiosulfate salts which reduce the yeild of sulfur and build up in the solution. To avoid the formation of crystals of iron sulfide or crystals of vanadium sulfide, thereby avoiding loss of polyvalent metal, the residence time of the redox solution after contact with the H₂S-containing gas and prior to contacting with the oxidized metal redox solution is limited to a relatively short time. Flow of solution from the last oxygenation stage, preferably through a valve or other circulation control device, to the reaction chamber provides controlled and continuous elemental sulfur formation in the reaction chamber.

21 Claims, 5 Drawing Sheets

PROCESS AND APPARATUS FOR REMOVAL OF H2S WITH SEPARATE ABSORBER AND OXIDIZER AND A REACTION CHAMBER THEREBETWEEN

FIELD OF THE INVENTION

The present invention is directed to a method and apparatus for selectively removing $H_2S$ gas from a process gas stream using a polyvalent metal redox catalyst solution, such as an iron chelate absorption solution, e.g., the ARI Technologies Inc. LO-CAT ® solution, or a metal vanadate-containing absorption solution, together with an anthraquinone disulfonate, such as that used in the Stretford process, to react the $H_2S$ gas selectively from the process gas stream to form elemental sulfur. More particularly, the present invention is directed to a method and apparatus for removing $H_2S$ from a process gas using a catalytic metal redox absorption solution, for absorption of $H_2S$ in an absorber chamber and conveying the polyvalent metal redox solution into a separate reaction chamber, together with substantially completely oxidized polyvalent metal redox solution from a final stage of an oxidizer chamber for reaction to form elemental sulfur in the reaction chamber, prior to oxidation of the reduced polyvalent metal redox solution in one or more oxidation stages of the oxidation chamber. In a preferred embodiment, the absorber chamber is separate from the oxidizer stages. The process and apparatus of the present invention are adaptable to any $H_2S$ removal process that uses a polyvalent metal redox solution in two valence states for absorption of $H_2S$, with or without other impurities, and regeneration of the metal redox solution.

BACKGROUND OF THE INVENTION AND PRIOR ART

Two of the most widely used processes for removal of $H_2S$ from process gas streams are the catalytic processes that use 1) an iron chelate catalytic absorption solution, e.g., the LO-CAT ® process and 2) a metal vanadate catalytic absorption solution, e.g., the Stretford process. The oxidation-reduction reactions that permit these processes to be carried out continuously are well known to those skilled in the $H_2S$ removal art and are well documented in the literature. The ferric iron chelate-$H_2S$ reactions can be represented as follows:

$H_2S(gas) + H_2O(Liquid) \rightleftharpoons H_2S(aqueous) + H_2O(Liquid)$ $H_2S(aqueous) \rightleftharpoons H^+ + HS^-$

$HS^- \rightleftharpoons H^+ + S^=$

By combining these equations, the resulting equation is:

In order to have an economical, workable process to effect catalytic oxidation of the hydrogen sulfide using an iron chelate redox solution, it is essential that the hydrogen sulfide gas be brought continuously into intimate contact with the chelated iron solution and that the ferrous iron chelate formed in the above described manner be continuously regenerated by oxidizing to ferric iron chelate by intimate contact with dissolved oxygen, preferably in the form of ambient air. The series of reactions that take place when regenerating the required ferric iron chelate can be represented by the following equations:

By combining these equations the resulting equation is:

The economics and workability of the Stretford process have depended upon a large volume of the metal vanadate solution. The reduced metal vanadate, after absorption of the $H_2S$ (as $HS^-$ or $S^=$) to form the metal vanadate in the +4 valance state is continuously regenerated to the +5 valance state by contact with dissolved oxygen for continuous use of the oxidized metal vanadate in the absorption zone to remove additional $H_2S$ as elemental sulfur. The Stretford process chemistry is typically summarized according to the following steps:

Absorption and dissociation of $H_2S$ in alkali:

$2H_2S(g) + 2Na_2CO_3 \rightarrow 2NaHS + 2NaHCO_3;$

Bisulfide oxidation with metavanadate to form elemental sulfur and reduced vanadium:

Vanadium reoxidation by dissolved molecular oxygen in the presence of ADA:

The reactions described have been carried out by means of two broad process flow schemes which may be described as "aerobic" and "anaerobic". In the aerobic flow scheme, both the absorption of $H_2S$ and the reactions related thereto and the absorption of oxygen and the regeneration reactions related thereto take place in the same vessel through which the reactive solution is circulated continuously. In the "anaerobic" process scheme, a $H_2S$-containing gas which is substantially free of oxygen is treated in an anaerobic absorber vessel and the solution is subsequently contacted with air or other oxygen-containing gas stream in a separate oxidizer vessel. The aerobic configuration has the advantage of simplicity, in that only a single gas-liquid contacting vessel is required, and may be the only way a gas containing both $H_2S$ and significant quantities of oxygen can be processed. However, the aerobic flow scheme has some substantial disadvantages, in that the co-absorption of oxygen and $H_2S$ usually leads to the formation of relatively large amounts of undesirable water-soluble compounds of sulfur and oxygen rather than elemental sulfur.

U.S. Pat. No. 4,238,462 describes a process and method of operation whereby an anaerobic gas stream containing H$_2$S could be treated and the solution regenerated in a single vessel without co-absorption of H$_2$S and O$_2$, and without the need for circulating pumps to circulate the redox solution between the absorption section and the regeneration section of the single vessel, described as an Autocirculation reactor.

The method of U.S. Pat. No. 4,238,462 has been commercially successful and has demonstrated the workability of the Autocirculation reactor. However, this method and apparatus suffer from several disadvantages which limit the scope of application of the Autocirculation reactor and also limit the efficiency of conversion of the H$_2$S to elemental sulfur rather than water soluble by-products. These disadvantages include having a very limited ability to process large volumes of H$_2$S contaminated gas because of the necessity of utilizing a liquid-filled absorber section with a low gas capacity per square foot of absorber area. Also, the rate of circulation of solution is set by the initial geometry of the Autocirculation reactor and can neither be measured nor controlled during operation. Finally, the Autocirculation reactor designs have generally shown relatively high thiosulfate production, in the range of 4 to 6% of the theoretical sulfur production, and relatively high losses of chelated iron with the settled sulfur product.

A great many prior art patents are directed to the removal of H$_2$S usng catalytic polyvalent metal redox solutions, such as an iron chelate or a metal vanadate Without exception, the prior art patents address the absorption of H$_2$S in solutions that contain at least the theoretical quantity of iron to provide two moles of iron for each mole of H$_2$S so that the conversion of absorbed H$_2$S to sulfur can be carried out in the absorber vessel or in a subsequent reaction chamber. Further, the presumption is implicit in prior art patents that it is necessary to provide sufficient iron to oxidize or complex with all the H$_2$S to prevent precipitation of the active catalyst metals as the metal sulfide. Further, it is well known to those skilled in the art of hydrogen sulfide oxidation by metal redox solution techniques that if insufficient oxidized metal is supplied to the absorber, free HS$^-$ and S$^=$ ions will exist in the solution exiting the absorber and the reaction chamber if one is provided. This will result in the non-selective reaction between HS$^-$, S$^=$ ions and dissolved oxygen in the oxidizer vessel, and cause the production of relatively large quantities of thiosulfate ions (S$_2$O$_3^=$) which are quite water soluble and accumulate in the metal redox catalyst solution. Ultimately, it is necessary to withdraw some solution to limit the concentration of such by-product salts in order to avoid problems of reduced gas solubility and efficiency of absorption of both H$_2$S and oxygen.

In the present invention it was discovered first that catalytic polyvalent metal redox solutions can be used to absorb H$_2$S from gas streams at high efficiency with less than the theoretical amount of polyvalent metal for conversion of the HS$^-$ and S$^=$ to sulfur provided that the solution possesses sufficient alkalinity for adequate H$_2$S absorption by means of the reaction: Na$_2$CO$_3$+H$_2$S→NaHCO$_3$+NaHS or other non-catalytic reaction, and provided the ferrous iron chelate produced by reduction of ferric iron chelate in the presence of free HS$^-$ ions or NaHS in solution can be removed from the absorber and reoxidized quickly after processing through the reactor. To achieve the full advantage of this discovery, it was found that it is highly desirable that the residence time of the solution in the highly reduced condition (exiting the absorber) should be kept quite short (e.g., less than about 2 minutes, preferably less than about 1 minute) so as to prevent precipitation of the metal sulfide. The introduction of the solution with an excess of HS$^-$ or S$^=$ ions (over that which could be reacted with chelated iron in the solution) into the oxidizer resulted in excessively high rates of water soluble, oxygen-containing sulfur compounds such as thiosulfate and sulfate, which would, in commercial practice, require high rates of blowdown to purge these soluble compounds, and which would result in the loss of excessive quantities of chelated iron.

Secondly, it was discovered that the high thiosulfate and sulfate formation could be prevented by conducting the highly reduced spent absorber solution into a reaction chamber in which it was mixed with highly oxidized redox solution rather than conducting the spent solution from the absorber directly into the oxidizer vessel or into the reaction chamber without first admixing in with oxidized solution. Advantageously, contact of highly reduced polyvalent metal redox solution with highly oxidized polyvalent metal redox solution results in completing the oxidation of HS$^-$ and S$^=$ to elemental sulfur, in the absence of contact with dispersed air or oxygen, and without the necessity of pumping the large volume of oxidized solution up to the high pressure of the absorber vessel.

Examples of the prior art patents directed to the use of polyvalent metal redox solutions for H$_2$S removal include the following: Hartley, et al. U.S. Pat. No. 3,068,065; Siebeud, et al. U.S. Pat. No. 3,897,219; Salemme U.S. Pat. No. 3,933,993; Meuly U.S. Pat. No. 4,009,251; Mancini, et al. U.S. Pat. No. 4,011,304; Thompson U.S. Pat. No. 4,189,462; Hardison U.S. Pat. No. 4,238,462; Blytas, et al. U.S. Pat. No. 4,356,155; Hardison U.S. Pat. No. 4,482,524; McManus, et al. U.S. Pat. No. 4,622,212; Primack, et al. U.S. Pat. No. 4,455,287; Fong, et al. U.S. Pat. Nos. 4,664,902 and 4,705,676.

One of the most significant problems in the removal of H$_2$S gas using a catalyzed polyvalent metal redox solution, particularly either an iron chelate redox absorption solution or a vanadium-based redox absorbtion solution, is that the efficiency of the redox reactions required of polyvalent metal-redox solutions is somewhat pH dependent. It is well known that polyvalent metal redox solutions are capable of solubilizing the contaminant metal ions at a pH well above pH 7, but the rate of absorption of H$_2$S decreases substantially with decreasing pH, despite statements in issued patents to the effect that a broad range of pH is acceptable—e.g., see Hartley U.S. Pat. No. 3,068,065; Pitts, Jr., et al. U.S. Pat. No. 3,097,925; Meuly, et al. U.S. Pat. No. 3,226,320; Roberts, et al. U.S. Pat. No. 3,622,273. Others have recognized that periodic addition of alkali is needed to maintain a suitably high pH for good absorption efficiency—e.g., see Roberts et al. U.S. Pat. No. 3,622,273, since the pH tends to drop as the reactions proceed.

As described in the Meuly U.S. Pat. No. 4,009,251, it is recognized that the pH of polyvalent metal redox solutions is lowered during the H$_2$S removal (absorption) redox reactions because of other side reactions between the redox solution and the H$_2$S and the resulting formation of acidic salts. As recognized in the Meuly U.S. Pat. No. 4,009,251, these acidic side reaction products are for the most part oxides of sulfur represented by the formula $S_xO_y$, where x is generally 1 or 2; and y is generally 2 or 3, that are present in an alkali-containing redox solution as predominantly sulfates and thiosulfates.

The more acidic salts that are formed in the polyvalent metal catalytic redox solution as a result of a relatively high pH, e.g., above 7, and particularly between about 8 and 9.5, the more frequent it is necessary to add alkali periodically to maintain the desired relatively high pH. As a result, more acidic salts are formed in the redox solution thereby requiring a periodic "blowdown" of polyvalent metal chelate solution (a term used to denote the irretrievable discarding of some or all of the polyvalent metal redox solution and replacement with fresh, non salt-contaminated solution). Since the polyvalent metal redox solutions are relatively expensive, the efficiency of the redox reations catalyzed by polyvalent metal redox solutions at a relatively high pH must be balanced by the expense of the addition of alkali and the expense of lost solution because of "blowdown" being necessary periodically to maintain acidic salt concentration in the catalytic redox solution below an acceptable upper limit. Further, the acidic sulfur salts formed during $H_2S$ absorption necessarily reduce the elemental sulfur yield from the $H_2S$ removal process.

One method disclosed useful to substantially inhibit salt formation in a polyvalent metal redox solution in a process for the catalytic removal of $H_2S$ from a process gas is disclosed in the Meuly U.S. Pat. No. 4,009,251, using particular polyvalent metal chelating agents to inhibit oxidation of sulfur beyond elemental sulfur. In accordance with the present invention, it has been found that thiosulfate concentration in the polyvalent metal redox catalytic solution can be controlled with a minimum of loss of polyvalent metal catalyst while reducing the size and cost of the equipment necessary for removing $H_2S$ from both low pressure and high pressure gas streams.

In accordance with the process and apparatus of the present invention, experiments have shown that new and unexpected results, such as greatly reduced pump horsepower and mechanical losses of catalyst, as well as low thiosulfate production in the polyvalent metal redox solution are achieved by operating the absorber with much less than the theoretical amount of iron, and discharging the spent solution, having an excess of dissolved sulfide ($HS^-$) and bisulfide ($S^=$) ions into a reaction chamber disposed in the process scheme between an absorber chamber and an oxidizer of the process. In this manner, $H_2S$-laden polyvalent metal redox solution, containing dissolved $HS^-$ and $S^=$, is contacted with polyvalent metal redox solution from the last oxidizer stage, containing relatively highly oxidized polyvalent metal redox solution and substantially zero dissolved oxygen, for very rapid formation of elemental sulfur in the reaction chamber. A portion of partially oxidized polyvalent metal redox solution from the reaction chamber then flows to the absorber vessel for further absorption of $H_2S$ from the process gas and the remainder of the partially oxidized polyvalent metal redox solution proceeds through the oxidation stage(s) for recirculation to the reaction chamber after complete oxidation.

Alternatively, some or all of the solution leaving the reaction chamber can flow to the oxidizer vessel for regeneration, and a portion of this relatively highly oxidized solution can be pumped into the absorber, while a majority of the solution is recycled to the reaction chamber and by-passes the absorber.

In either of these methods, there is a substantial saving in pump horsepower over a conventional redox process in which all of the regenerated solution is pumped through the absorber.

SUMMARY OF THE INVENTION

The above and other disadvantages have been overcome in accordance with the method and apparatus of the present invention by providing an apparatus including a reaction chamber or a reaction vessel interposed in the polyvalent metal redox solution flow path between an absorber chamber or absorber vessel and an oxygenation chamber, including one or more oxygenation stages, for contact in the reaction chamber of $H_2S$-laden catalytic polyvalent metal redox solution from the absorber chamber with highly oxidized polyvalent metal redox solution from the last oxygenation stage. The completely oxidized polyvalent metal redox solution, including concentrated $Fe^{+3}$ or $V^{+5}$ contacts the $H_2S$-laden redox solution from the absorber chamber for reoxidation of the dissolved $HS^-$ and $S^=$ and any of the polyvalent metal sulfur compounds (presumably a chelated iron sulfide or a vanadium sulfide), before crystals of iron sulfide or crystals of vanadium sulfide are formed, to avoid loss of polyvalent metal by precipitation. Circulation of solution from the last oxygenation stage, preferably through a valve or other circulation control device, to the reaction chamber provides controlled and continuous supply of oxidized metal to react with sulfide and bisulfide ions and results in elemental sulfur formation in the reaction chamber, and permits high rates of solution circulation through the oxidizer and reaction chambers without high pumping costs usually associated with circulation of theoretical quantities of polyvalent metal solution at low concentration through the absorber.

The oxidation chamber may be divided into two or more separate sequential contact stages for continued gas-liquid contact. The reaction chamber separates the absorber chamber or vessel, for gas-liquid mass transfer between the polyvalent metal redox solution and the $H_2S$-laden gas stream, from the oxidizer chamber or oxidizer stages for gas-liquid mass transfer between the partially reduced polyvalent metal redox solution and an oxygen-containing gas, preferably air, to provide controlled reaction time and controlled circulation of solution from both the absorber and the oxidizer to the reaction chamber. Reliable, controlled circulation of solution to the reaction chamber is achieved regardless of the desired rate of flow of each different gas to the absorber chamber and to the oxidizer chamber; and dissolved $H_2S$ gas in the polyvalent metal redox solution, as well as polyvalent metal-sulfur compounds, can be oxidized very quickly in the reaction chamber prior to formation of solid polyvalent metal-sulfide compounds, and without substantial thiosulfate ($S_2O_3^=$) formation because there is little or no oxygen present in the reaction chamber and there is no means for circulating solution containing $HS^-$ or $S^=$ ions into the oxidizer. In the application to liquid redox processes for oxidation of $H_2S$ to sulfur and water, there is little or no thiosulfate production since elemental sulfur is formed essentially exclusively in the reaction chamber.

There is a further advantage which may be significant in terms of application to other chemical systems. With the method and apparatus of the present invention, the Stretford process, or any other mass transfer process requiring liquid contact with two or more different gases can be used, such as Shafer, Unisulf, and the like, or any other gas-liquid contact mass transfer process that requires substantial residence time.

In accordance with an important feature of the present invention, it has been found that salt (particularly thiosulfate) formation can be avoided or substantially reduced in an absorption zone and reaction chamber of the process and apparatus of the present invention, preferably operated at a pH above 7, even as high as about 8 to about 9.5 or 10, by contacting the $H_2S$-laden polyvalent metal redox solution out of an absorber with completely oxidized chelate solution from the the last oxidation stage. In accordance with the process and apparatus of the present invention, the dissolved oxygen content in the polyvalent metal redox solution that contacts the $H_2S$-contaminated process gas can be controlled by circulation of a portion of the polyvalent metal redox solution from the reaction chamber to the absorber. In another embodiment, shown in FIG. 4, the $H_2S$-laden process gas can be contacted with completely oxidized polyvalent metal redox solution in the absorber, and the $H_2S$-laden redox solution is again contacted with completely oxidized redox solution in the reaction chamber.

In one process embodiment of the present invention, the concentration of polyvalent metal in the redox solution is such that the redox solution provides less than the stoichiometric quantity of polyvalent metal required for complete reaction with the $H_2S$ from the process gas, and the pH is at a level of at least about 6.5, and preferably in the range of about 7.5 to about 8.5. To achieve the full advantage of this embodiment of the present invention, the quantity and flow rate of polyvalent metal redox solution should be such that 100% or less of the stoichiometric quantity of polyvalent metal redox solution is present in the absorption zone of the process, and preferably about 25% to about 50% or less of the stoichiometric quantity of polyvalent metal redox solution necessary for complete $H_2S$ absorption is present in the absorption zone, where the alkalinity of the solution is sufficiently high so that all of the $H_2S$ can be absorbed and ionized to $HS^-$ and $S^=$ without a decrease in pH below about 6.5.

Quite surprisingly, it has been found that the method and apparatus of the present invention, with or without the above-described sub-stoichiometric quantity of polyvalent metal redox solution, will provide essentially complete sulfur recovery, without a substantial quantity of salts being formed in the absorption zone or reaction chamber of the process and apparatus and without precipitation of the polyvalent metal of the polyvalent metal redox solution, particularly polyvalent metal-sulfur compounds, e.g., sulfides, by contacting the $H_2S$-absorbed redox solution from the absorber with highly oxidized polyvalent metal ($Fe^{+3}$ or $V^{+5}$) redox solution from the last oxidizer stage of the process. Preferably, in one embodiment of the present invention, the pH of the polyvalent metal redox solution is maintained at a level of at least about 8.0; and the concentration and flow rate of the polyvalent metal redox solution, in relation to concentration and flow rate of $H_2S$ in the process gas, is less than the theoretical quantity needed for complete $H_2S$ ($HS^-$ and $S^=$) reaction. During the time that dissolved $HS^-$ and $S^=$ ions are in contact with completely oxidized solution rich in oxidized polyvalent metal in the reaction chamber, the reaction: $Chelon.FeS + Chelon.Fe^{+3} \rightarrow Chelon.Fe^{+2} + S°$ proceeds very rapidly, and contact times on the order of about 15 seconds are sufficient to essentially complete the reaction in the reaction chamber and prevent the formation of thiosulfates ($S_2O_3^=$) in the oxidizer. Accordingly, nearly complete elimination of thiosulfate is achieved in accordance with the process and apparatus of the present invention.

Figure 5:
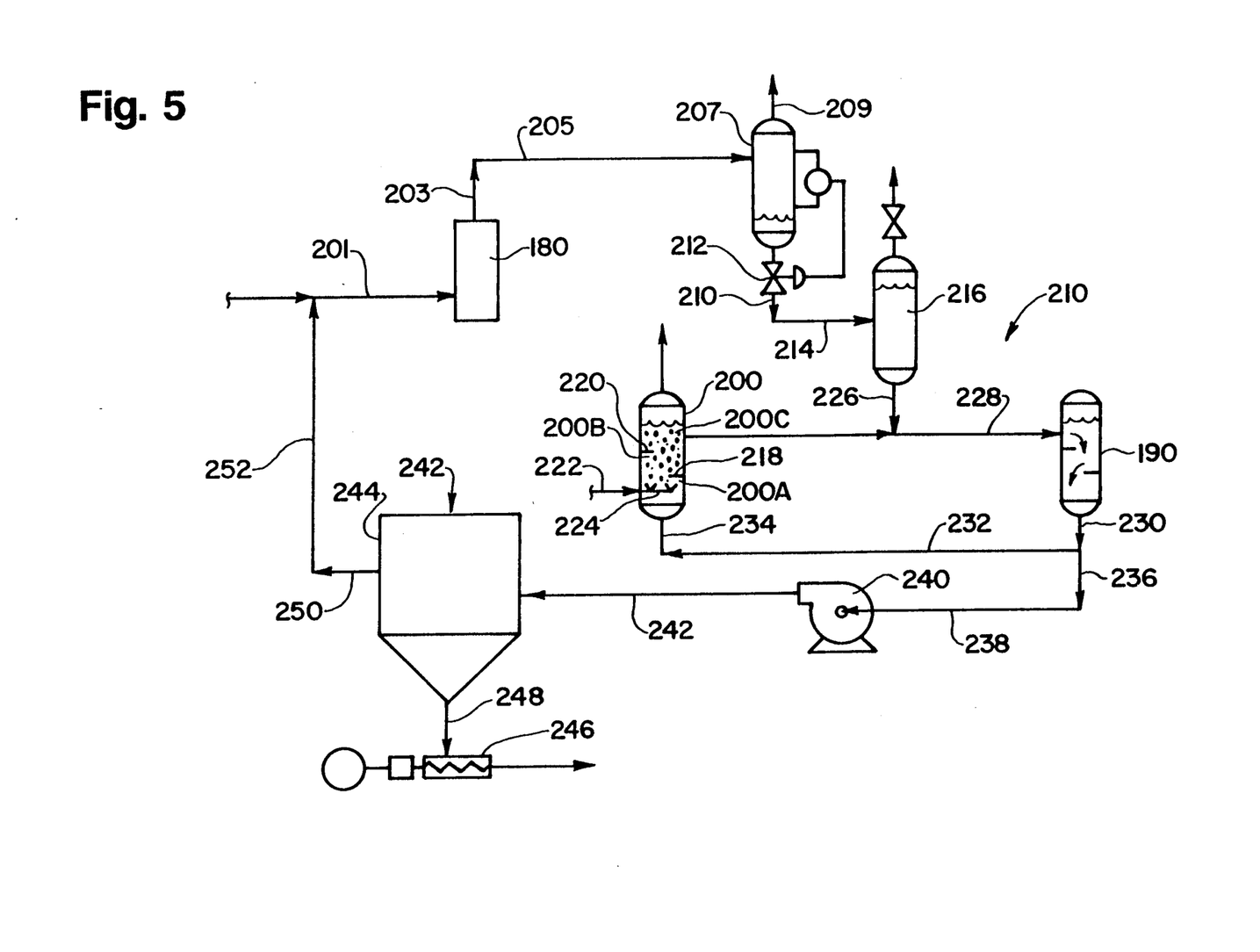
FIG. 5 is a schematic side view of another embodiment of the process and apparatus of the present invention.

In this manner, in accordance with a new and unexpected feature of the method and apparatus of the present invention, the process and apparatus allows operation with low rates of circulation of the polyvalent metal redox sultion to the absorber, yet prevents the formation of polyvalent metal-sulfur reaction products in the absorber or reaction chamber so long as the redox solution entering the reaction chamber is at a high oxidation state (an amount of polyvalent metal oxidized to its higher valence state of at least the stoichiometric quantity needed for reaction with all of the $HS^-$ plus $S^=$ ions present in the reaction chamber), while the reduced redox solution leaving the absorption chamber has a lower oxidized iron or oxidized vanadium content. This flow scheme for polyvalent metal redox solution provides a higher rate of oxygen absorption in the reaction chamber so that the sulfur reaction is essentially immediate (complete in about one minute or less in the reaction chamber in the case of chelated iron, but requiring as long as 15 to 30 minutes in the case or vanadium) while minimizing the amount of thiosulfate formed, thereby eliminating or lessening the need for periodic alkali addition, and thereby avoiding a buildup of acidic salts in the polyvalent metal redox solution. As shown in FIG. 5, the redox solution is removed from the absorber in a short enough time, e.g., less than one minute or so average residence time, and then brought into contact with catalytic polyvalent metal redox solution from the oxidizer chamber, rich in oxidized polyvalent metal ($Fe^{+3}$ or $V^{+5}$) in a separate reaction chamber prior to contact of the reduced redox solution with oxygen, for recovery of the sulfur from the reaction chamber. Accordingly, polyvalent metal redox solution losses are minimized.

Accordingly, one aspect of the present invention is to provide a method and apparatus for causing mass transfer between a highly oxidized catalytic polyvalent metal redox solution and a polyvalent metal redox solution having excess dissolved $H_2S$, in a reaction chamber, for formation of elemental sulfur in the reaction chamber, and then re-oxidizing the polyvalent metal redox solution.

Another aspect of the present invention is to provide a method and apparatus for continuously removing hydrogen sulfide ($H_2S$) gas from a process gas stream by intimate contact with a catalytic polyvalent metal redox solution in an absorption mass transfer zone, thereby forming a reduced polyvalent metal redox solution containing dissolved $HS^-$ and $S^=$ ions; and contacting the reduced polyvalent metal redox solution in a reaction chamber with highly oxidized (relatively free of $HS^-$ and $S^=$) polyvalent metal redox solution to form elemental sulfur.

Another aspect of the present invention is to provide a method and apparatus for continuously removing hydrogen sulfide ($H_2S$) gas from a sour process gas stream without conversion of a significant fraction of the $H_2S$ to thiosulfate, e.g., metal thiosulfates such as $Na_2S_2O_3$, generally less than about 5% by weight of the sulfur converted to thiosulfate, and preferably less than 1% by weight.

Still another aspect of the present invention is to provide a method and apparatus for continuously removing hydrogen sulfide ($H_2S$) gas from an $H_2S$ containing process gas by intimate contact of the process gas with a polyvalent metal redox catalyst solution in one mass transfer zone for absorption of the $H_2S$ gas into the catalyst solution, and then reacting the $H_2S$-absorbed polyvalent metal redox solution with highly oxidized polyvalent metal redox solution which has been regenerated in an autocirculation oxidizer wherein a relatively high circulation rate can be maintained, without expenditure of pump power, in a reaction chamber or vessel prior to re-oxygenating the $H_2S$-absorbed polyvalent metal redox solution in an oxidizer section of the process and apparatus to avoid thiosulfate ($S_2O_3^=$) formation.

BRIEF DESCRIPTION OF THE DRAWINGS

The above and other aspects and advantages of the present invention will become more apparent from the following detailed description of the preferred embodiments taken in conjunction with the drawings wherein.

DETAILED DESCRIPTION OF THE PREFERRED EMBODIMENTS

Figure 1:
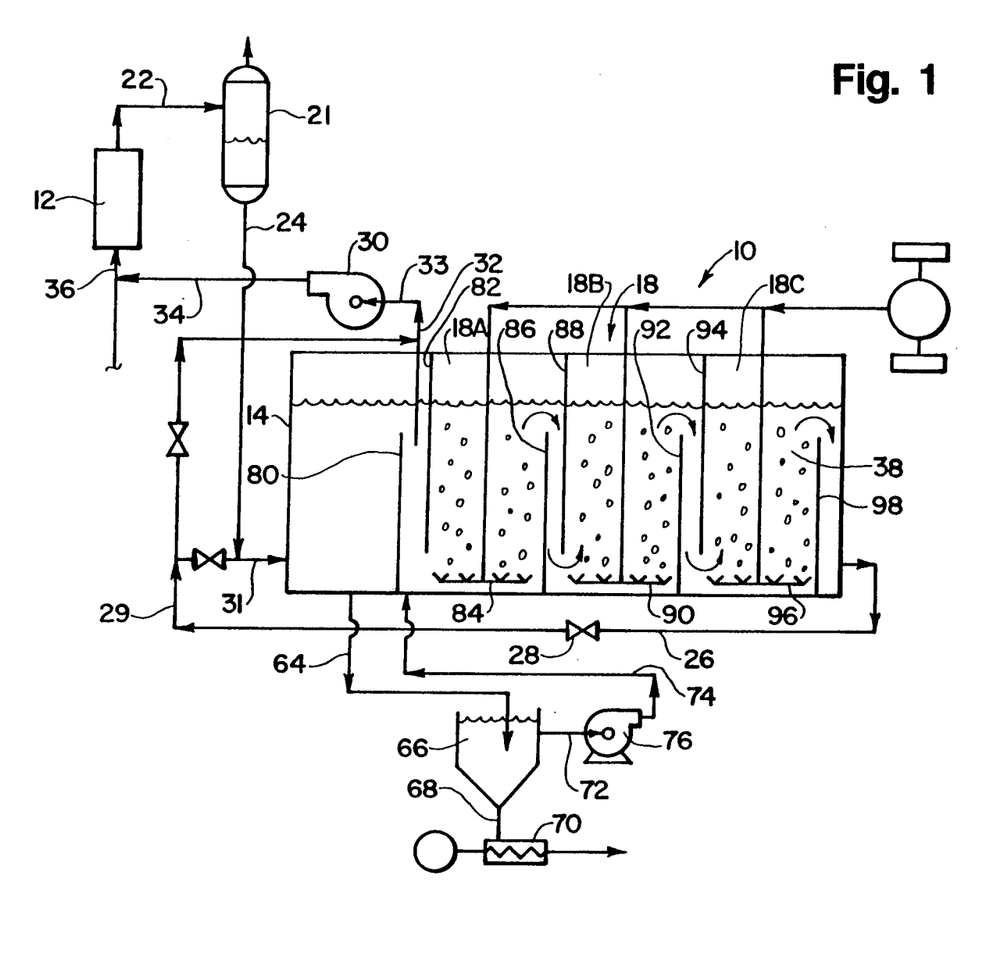
FIG. 1 is a schematic side view of one embodiment of the gas-liquid mass transfer oxidizer/absorber vessel of the present invention, including a sulfur recovery vessel, used in the polyvalent metal redox process and apparatus of the present invention for use with any polyvalent metal redox solution, particularly an iron chelate solution or a metal vanadate solution.

Turning now to the drawings, and initially to FIG. 1, there is shown a cross flow absorber/oxidizer process, and apparatus, generally designated by reference numeral 10, including a separate absorber vessel 12, a reaction chamber 14, and an oxidizer chamber, generally designated 18. The oxidizer chamber 18 includes three separated oxidation stages 18A, 18B and 18C, for the absorption of oxygen from air or other oxygen-containing gas stream and the reaction of said oxygen with the hydrogen sulfide (as $HS^-$ and $S^=$) from a process gas. The reaction chamber 14 is disposed between the last oxidizer stage 18C and the polyvalent metal solution from the absorber vessel 12, held in gas-liquid separator 21, and receives the polyvalent metal redox solution containing dissolved $H_2S$, from the absorber vessel 12, via gas-liquid separator 21 and conduits 22 and 24, and highly oxidized polyvalent metal redox solution (essentially free of $HS^-$ or $S^=$) from the last oxidizer stage 18C, via conduit 26, controlled via ball valve 28.

An $H_2S$-containing process gas flows through absorber 12, together with polyvalent metal redox solution pumped from reaction chamber 14, via pump 30 (FIG. 1) or 161 (FIG. 4), submerged conduit 32, and conduits 34 and 36 for intimate contact with the ferric iron chelate solution or vanadium ($V^{+5}$) salt (Stretford process) solution from the reaction chamber 14. The $H_2S$-laden polyvalent metal redox solution from the gas-liquid separator vessel 21 flows by gravity or by pressure differences through conduit 24 into the reaction chamber 14 together with highly oxidized polyvalent metal redox solution from the last oxidizer stage 18C, pumped to the reaction chamber through conduit 26 and ball control valve 28.

The dissolved hydrogen sulfide components from the process gas contained in the polyvalent metal redox solution 20 that enters the reaction chamber 14 is reacted with highly oxidized polyvalent metal redox solution 38 from last oxidation stage 18C, in the reaction chamber 14 to form elemental sulfur, or soluble polysulfides incapable of oxidation to thiosulfate or sulfate. Sulfur and polyvalent metal redox solution flow by gravity through conduit 64 into an external sulfur settler vessel 66, where sulfur solids settle and are removed through bottom sulfur conduit 68. The recovered sulfur and a small quantity of polyvalent metal redox solution are pumped by slurry pump 70 to a sulfur recovery apparatus, such as a melter (not shown) for separating molten sulfur from the polyvalent metal redox solution.

The polyvalent metal redox solution separated from the settled sulfur in settler 66 is pumped through conduits 72 and 74 by pump 76 either back into the reaction chamber 14, or into the first oxidation stage 18A, as shown in FIG. 1.

A portion of the partially reduced polyvalent metal redox solution in the reaction chamber 14 is pumped via pump 30 to the absorber 12 for further absorption of $H_2S$, and the remainder of the partially reduced polyvalent metal redox solution flows over baffle 80 and under baffle 82 into the first oxidizer stage 18A of oxidizer 18, where the polyvalent metal redox solution is oxidized by air flowing through sparger 84, and flows over baffle 86 and under baffle 88 to the second stage 18B of oxidizer 18. The partially oxidized solution in the second stage 18B is further oxidized by air flowing through sparger 90 and flows over baffle 92, and under baffle 94 to the third stage 18C of oxidizer 18, for further oxidation with air from sparger 96. From the third oxidation stage 18C, the fully oxidized polyvalent metal redox solution flows over baffle 98, and through conduit 26 and valve 28 to the reaction chamber 14.

The liquid flow control achieved with the valve 28 and reaction chamber 14 is a marked improvement over attempts to control autocirculation liquid flow using only control of air flow through the air spargers 84, 90 and 96.

The air spargers 84, 90 and 96 in each of the three oxidizer stages 18A, 18B and 18C of the oxidizer zone 18 can be formed simply from pieces of slit and plugged hose attached to a pipe disposed along the bottom of each oxidizer stage 18A, 18B and 18C. Similarly, other configurations of air spargers or diffusers can be used, as is well known to those skilled in the art.

Figure 2:
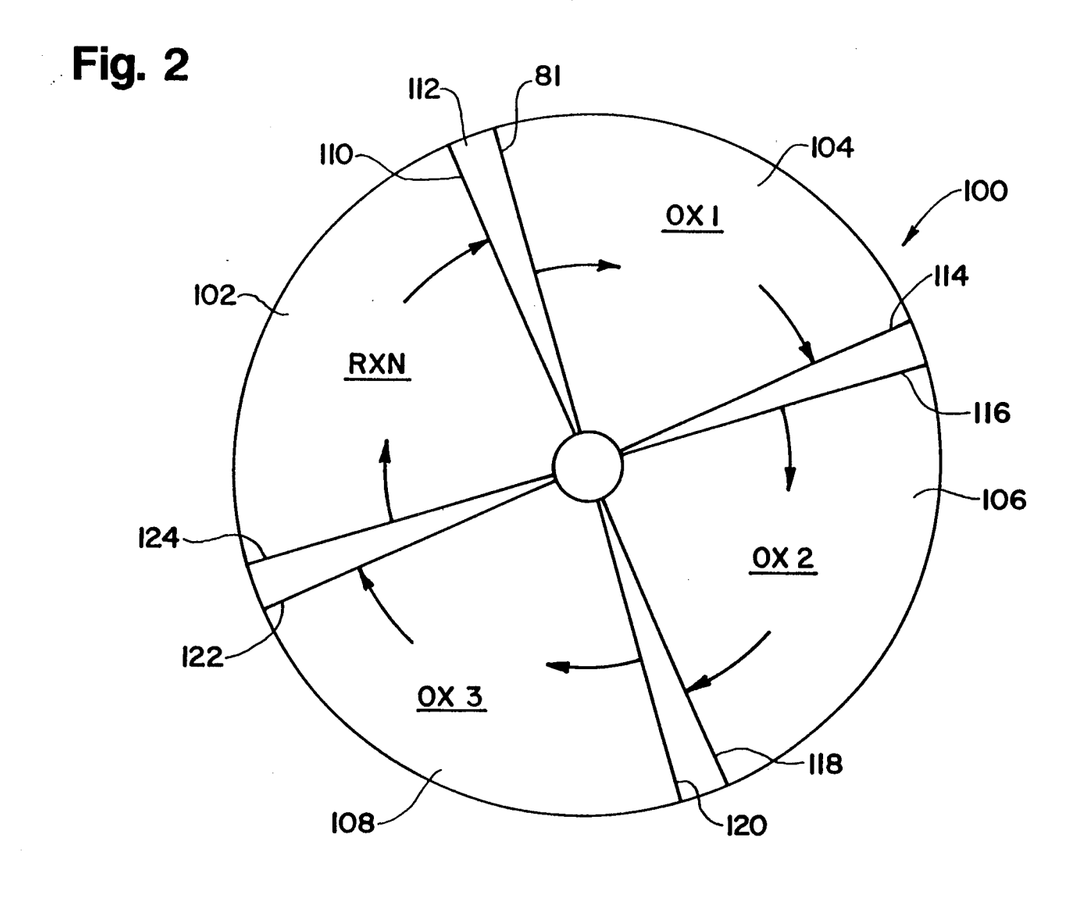
FIG. 2 is a schematic top view of another embodiment of the oxidizer/absorber mass transfer vessel, for use in the method and apparatus of FIG. 1, as a cylindrical design.

The circular design for the reaction chamber and oxidation stages of the process and apparatus, shown in FIG. 2, is generally designated 100, and includes a reaction chamber 102 and an oxidizer chamber that is divided into three gas-separated stages, 104, 106 and 108.

Horizontally and vertically spaced baffles 110 and 112, disposed between the reaction chamber 102 and the first oxidation stage 104 are constructed similar to the baffles shown in the FIG. 1 embodiment so that liquid flows over baffle 110 and under baffle 112 to reach the first oxidizer stage 104. Similarly, horizontally and vertically spaced baffles 114 and 116 are disposed between the first and second oxidizer stages 104 and 106; horizontally and vertically spaced baffles 118 and 120 are disposed between the second and third oxidizer stages 106 and 108; and horizontally and vertically spaced baffles 122 and 124 are disposed between the third oxidizer stage 108 and the reaction chamber 102. The spaced baffles 110 and 112; 114 and 116; 118 and 120; and 122 and 124 are constructed like those shown in FIG. 1 such that liquid from each successive oxidizer stage flows over its adjacent baffle 114, 118 or 122, and under the baffle 116, 120 or 124 adjacent the next succeeding zone. Like FIG. 1, the baffle that the liquid flows under prevents fluid communication above the liquid level between adjacent zones. Although not shown in FIG. 2, air spargers are disposed in oxidizer stages 104, 106 and 108.

Figure 3:
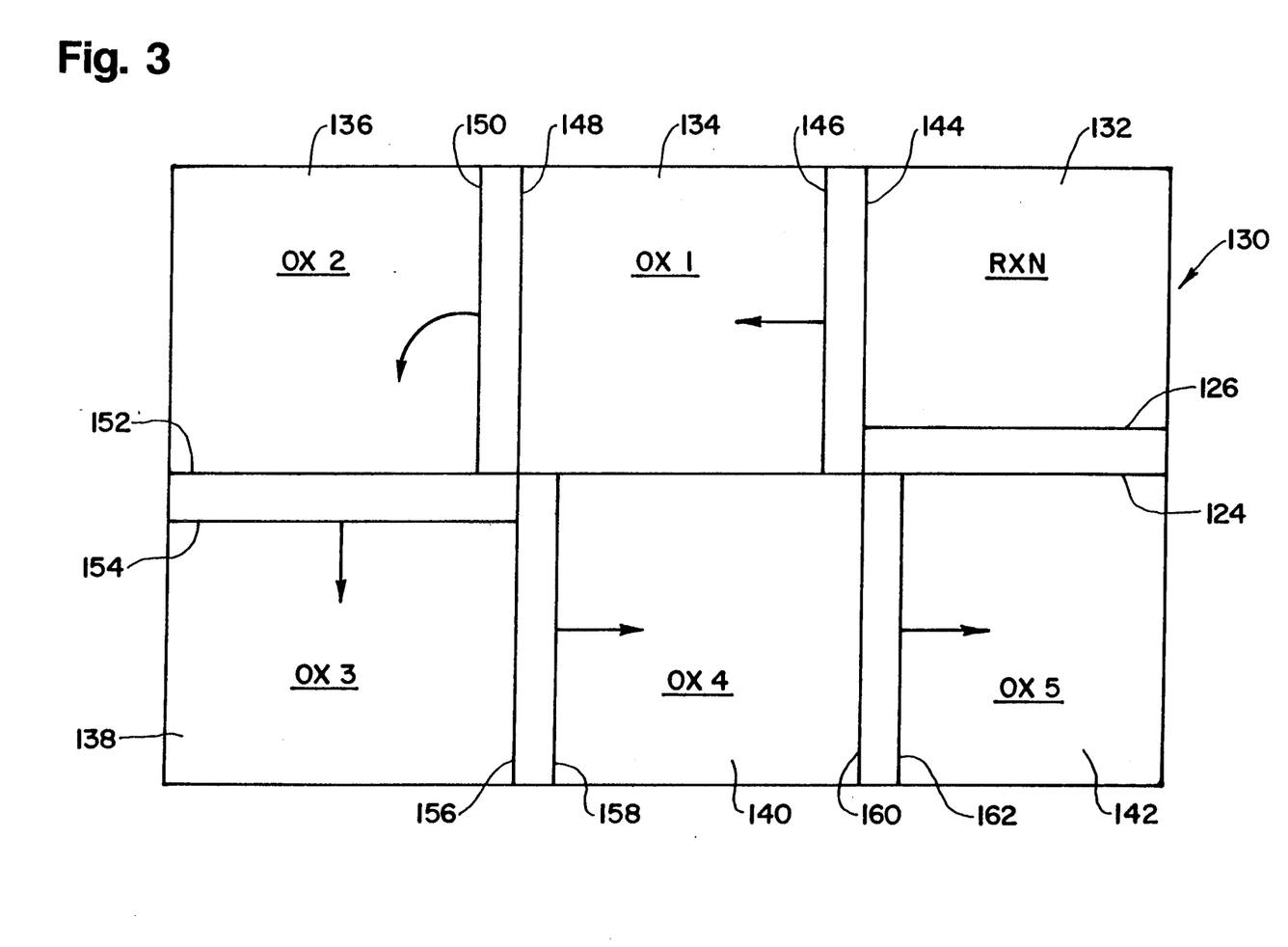
FIG. 3 is a schematic top view of another embodiment of the oxidizer/absorber mass transfer vessel, for use in the method and apparatus of FIG. 1, as an alternative rectangular design providing additional oxidation stages.

The reaction chamber/oxidizer vessel construction of FIG. 3, generally designated 130, is an enlarged version of that shown in FIG. 1 that provides additional oxidizer zones, and includes a reaction chamber 132 and a total of five oxidizer zones, 134, 136, 138, 140 and 142. Vertically and horizontally spaced baffles 144 and 146 separate reaction chamber 132 from the first oxidizer stage 134. A portion of the reduced polyvalent metal redox solution from reaction chamber 132 flows over baffle 144 and under baffle 146 into the first oxidizer stage 134. Baffle 146 prevents fluid communication above the liquid level between reaction chamber 132 and the first oxidizer stage 134. Similarly, horizontally and vertically spaced baffles 148 and 150; 152 and 154; 156 and 158; 160 and 162; and 124 and 126 are constructed like those shown in FIG. 1 to prevent fluid communication above the liquid level between adjacent zones and to allow liquid from one zone or chamber to flow over its adjacent baffle 144, 148, 152, 156, 160 or 124, and under the baffle 146, 150, 154, 158, 162 or 126 adjacent the next succeeding zone. Although not shown in FIG. 3, air spargers are disposed in oxidizer stages 134, 136, 138 140 and 142.

Figure 4:
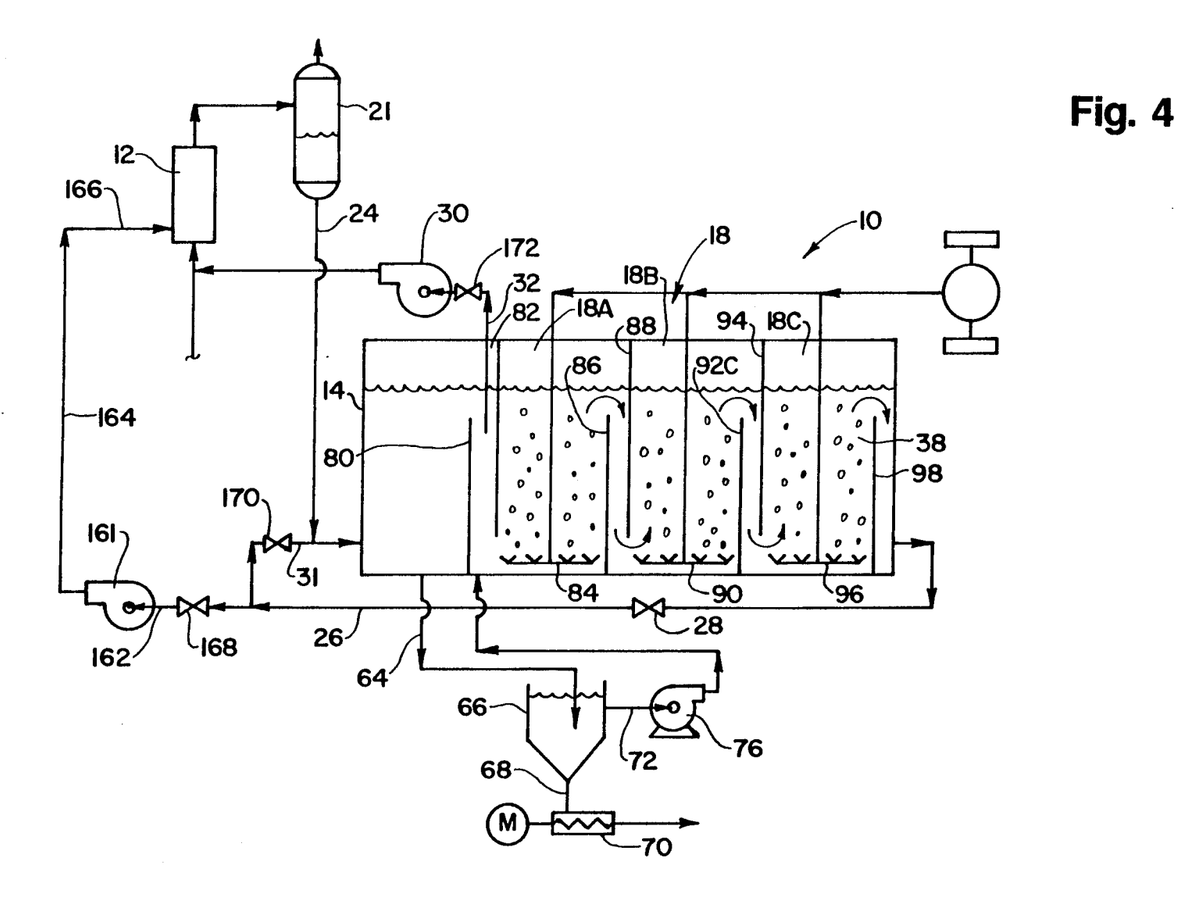
FIG. 4 is a schematic side view of another embodiment of the process and apparatus of the present invention.

The method and apparatus shown in FIG. 4 is similar to that described with reference to FIG. 1, and provides new and unexpected control over the degree and rapidity of the absorption and oxidation of the $HS^-$ and $S^=$ ions dissolved in the catalytic polyvalent metal chelate solution within an absorber vessel, and provides new and unexpected control over the amount of dissolved oxygen and degree of oxygenation of the polyvalent metal redox solution that 1) contacts the process gas in the absorber 12, and 2) contacts the reduced, $HS^-$, $S^=$ containing polyvalent metal redox solution in the reaction chamber 14. The method and apparatus of FIG. 4 is very similar to that shown in FIG. 1 and includes additional flow conduits 162, 164, 166 and valve 168; and valve 170 in conduit 31 for providing a desired percentage of highly oxidized polyvalent metal redox solution from the last oxidizer stage 18C to the absorber 12, with the remainder of the oxidized polyvalent metal redox solution flowing to the reaction chamber 14; as well as valve 172 in conduit 33 and valve 172 in conduit 31 for controlling the desired percentage of partially or completely reduced polyvalent metal redox solution to the absorber 12, for absorption of $H_2S$ gas from the process gas.

Like the method and apparatus shown in FIG. 1, the method and apparatus of FIG. 4 includes a separate absorber vessel 12, a reaction chamber 14, and an oxidizer chamber, generally designated 18. The oxidizer chamber 18 includes three separated oxidation stages 18A, 18B and 18C, for removal of hydrogen sulfide (as $HS^-$ and $S^=$) from a process gas. The reaction chamber 14 is disposed in the process between the last oxidizer stage 18C and the absorber vessel 12. The polyvalent metal redox solution, containing dissolved $H_2S$, and treated process gas from the absorber vessel 12, flow via conduit 22 to gas-liquid separator vessel 21. The spent redox solution flows from separator vessel 21, via conduit 24 to the reaction chamber 14, where the reduced redox solution is contacted with highly oxidized polyvalent metal redox solution (essentially free of $HS^-$ or $S^=$) from the last oxidizer stage 18C, via conduit 26, controlled via ball valves 28 and 170.

An $H_2S$-containing process gas flows through absorber 12, together with polyvalent metal redox solution pumped from reaction chamber 14, via pump 30, submerged conduit 32, and conduits 34 and 36; and/or together with highly oxidized polyvalent metal redox solution 38 from the last oxidizer stage 18C, flowing through conduit 26, valve 28, conduit 162, valve 168, and conduits 164 and 168 for intimate contact with the liquid ferric iron chelate solution or liquid vanadium (Stretford process) redox solution from the reaction chamber 14.

The $H_2S$-laden polyvalent metal redox solution from the holding vessel 21 flows by gravity through conduit 24 into the reaction chamber 14, and highly oxidized polyvalent metal redox solution flows from the last oxidizer stage 18C, via conduits 26, 29, 31 and valves 28 and 170, to the reaction chamber 14 through conduit 26. In accordance with this FIG. 4 embodiment, valve 168 in conduit 162 and valve 170 in conduit 31 can be adjusted to control the amount of highly oxidized polyvalent metal redox solution that flows from the last oxidizer stage 18C into the absorber chamber 12 through valve 168 and pump 161, with the remaining highly oxidized polyvalent metal redox solution flowing into the reaction chamber 14, through valve 170. Generally, 0 to about 95% by weight of the highly oxidized polyvalent metal redox solution flowing from the last oxidizer stage 18C through valve 28 is conveyed to the absorber 12 with about 5% to 100% of the highly oxidized polyvalent metal redox solution being directed from the last oxidizer stage 18C through valve 170 into the reaction chamber 14. The capacity to control the polyvalent metal redox mixture of 1) highly oxidized polyvalent metal redox solution from the last oxidizer stage 18C through valve 168, and 2) partially reduced polyvalent metal redox solution from the reaction chamber 14 through valve 172, provides control over the degree and speed of the absorption and oxidation of the dissolved $H_2S$ components in the polyvalent metal redox solution in both the absorber 12 and the reaction chamber 14. By directing some, e.g., about 5% to about 25% by weight, highly oxidized polyvalent metal redox solution from the last oxidizer stage 18C to the absorber 12 through valve 168 and conduits 162, 164 and 166, some elemental sulfur may form in the absorber 12 or in the gas-liquid separator 21. Any sulfur formed in the absorber 12 or holding vessel 21 can be directed by pressure or gravity to the reaction chamber 14, through conduit 24, for recovery from the reaction chamber 14, or can be recovered directly from the absorber 12 and/or gas-liquid separator vessel 21. The circular and rectangular designs shown in FIGS. 2 and 3 also are useful for the reaction chamber/oxidizer vessel in the process described with reference to FIG. 4.

The dissolved hydrogen sulfide components from the process gas contained in the polyvalent metal redox solution 20 that enters the reaction chamber 14 is reacted with highly oxidized polyvalent metal redox solution 38 from last oxidation stage 18C, in the reaction chamber 14 to form elemental sulfur. Sulfur and polyvalent metal redox solution flow by gravity or are pumped through conduit 64 into an external sulfur settler vessel 66, where sulfur solids settle and are removed through bottom sulfur conduit 68. The recovered sulfur and a small quantity of polyvalent metal redox solution are pumped by slurry pump 70 to a sulfur recovery apparatus, such as a melter (not shown) for separating molten sulfur from the polyvalent metal redox solution which may be returned to the process.

The polyvalent metal redox solution separated from the settled sulfur in settler 66, FIG. 4, is pumped through conduits 72 and 74 by pump 76 either back into the reaction chamber 14, or into the first oxidation stage 18A, as shown in FIG. 1.

A portion of the partially reduced polyvalent metal redox solution in the reaction chamber 14, FIG. 4, is pumped via pump 30 to the absorber 12 for further absorption of $H_2S$, and the remainder of the partially reduced polyvalent metal redox solution flows over baffle 80 and under baffle 82 into the first oxidizer stage 18A of the oxidizer 18, where the polyvalent metal redox solution is oxidized by air flowing through sparger 84, and flows over baffle 86 and under baffle 88 to the second stage 18B of oxidizer 18. The partially oxidized solution in the second stage 18B is further oxidized by air flowing through sparger 90 and flows over baffle 92, and under baffle 94 to the third stage 18C of oxidizer 18, for further oxidation with air from sparger 96. From the third oxidation stage 18C, the fully oxidized polyvalent metal redox solution flows over baffle 98, and through conduit 26 and valve 28 to the reaction chamber 14, or via the oxidized solution pump 30 to the absorber 12.

In accordance with another important embodiment of the present invention, shown schematically in FIG. 5, a separate absorber 180, a separate reaction vessel 190, and a separate oxidizer vessel 200 are provided for the catalytic polyvalent metal redox removal of $H_2S$ from a process gas stream. With reference to FIG. 5, there is shown a cross flow absorber/oxidizer process, and apparatus generally designated by reference numeral 210, including the separate absorber vessel 180, the separate reaction vessel 190, and the separate oxidizer vessel 200. A process gas containing $H_2S$ is conveyed into the absorber 180 through conduit 201 together with polyvalent metal redox solution for removal (absorption) of hydrogen sulfide (as $HS^-$ or $S^=$). The reduced polyvalent metal redox solution is discharged from the absorber 180 through conduits 203 and 205, together with the process gas, to a gas/liquid separator vessel 207. The spent gas exits separator vessel 207 through upper conduit 209 and the reduced polyvalent metal redox solution exits the separator 207 from lower conduit 210 and valve 212 and is conveyed through conduit 214 to a gas-liquid separator vessel 216.

The oxidizer vessel 200 is a single vertically disposed vessel separated into three laterally spaced compartments or stages 200A, 200B and 200C by horizontal baffles 218 and 220 for oxidation of reduced polyvalent metal redox solution from reactor 190 with an oxygen-containing gas entering oxidizer vessel 200 through conduit 222 and sparger 224. Reduced polyvalent metal redox solution from the gas-liquid separator vessel 216, containing dissolved $HS^-$ and $S^=$, flows under pressure or by gravity through conduits 226 and 228 to the reactor 190 where the polyvalent metal redox solution combines with highly oxidized polyvalent metal redox solution from the last oxidizer stage 200C of the oxidizer vessel 200 to form elemental sulfur in the reactor 190. Most of the polyvalent metal redox solution from the reactor 190 is conveyed through conduits 230, 232 and 234 to the oxidizer vessel 200 for regeneration of the polyvalent metal redox solution back to the higher valence state for further oxidation of dissolved $H_2S$ components to elemental sulfur in the reactor 190. A small polyvalent metal solution stream, e.g., about 1% to about 50% by weight, is conveyed together with the elemental sulfur from the reaction vessel 190 through conduits 236 and 238, pump 240 and conduit 242 to sulfur recovery apparatus, generally designated 242, including sulfur settling vessel 244 and sulfur slurry pump 246 adapted to receive sulfur/redox solution from conduit 248 and convey the slurry to a melter (not shown) or other means for separating sulfur from polyvalent metal redox solution, preferably including means for recovering and re-using the polyvalent metal redox solution in the process. Reduced polyvalent metal redox solution is pumped from an upper portion of the sulfur settling vessel 244 along conduits 250 and 252 to join the process gas in conduit 201 entering the absorber vessel 180.

It should be understood that the present disclosure has been made only by way of preferred embodiments and that numerous changes in details or construction, combination and arrangement of parts and process steps can be resorted to without departing from the spirit and scope of the invention as hereunder claimed.

What is claimed is:

1. In a continuous process for intimate contact of a liquid reagent sequentially with first and second different gases in separate vessels, the improvement comprising:

introducing the first gas into a first mass transfer vessel for intimate contact and mass transfer with the liquid reagent;

introducing liquid reagent from said first mass transfer vessel, after mass transfer with said first gas, into a reaction chamber;

introducing the second gas into a separate, second mass transfer vessel for intimate contact and mass transfer with liquid reagent from the reaction chamber;

introducing liquid reagent from said second mass transfer vessel, after mass transfer with said second gas, into said reaction chamber for contact and mixing with liquid reagent from said first mass transfer vessel to form a reaction product in said reaction chamber;

recirculating a portion of the liquid reagent from the reaction chamber to the first mass transfer vessel, without intermediate mass transfer with said second gas, for further mass transfer with the first gas; and continuously flowing, in a controlled flow, liquid reagent from said second mass transfer zone into the reaction chamber, where no substantial additional gas is introduced, to provide a residence time and intermixing of the liquid reagents from the first and second mass transfer vessels.

2. The process as defined in claim 1 wherein the portion of the liquid recirculated from the reaction chamber to the first mass transfer vessel is less than 75% by weight of the total liquid.

3. The process as defined in claim 1 wherein the flow of liquid through the second mass transfer vessel is achieved by solution density differences in successive mass transfer stages of the second mass transfer vessel.

4. The process as defined in claim 1 wherein the liquid reagent is a polyvalent metal redox solution, and wherein the first gas is an $H_2S$-containing process gas, and wherein the second gas is an oxygen-containing gas.

5. The method of claim 4 further including the step of removing elemental sulfur from the reaction chamber together with some polyvalent metal redox solution, and separating the sulfur from the polyvalent metal redox solution.

6. The method of claim 4 wherein the process gas further includes a cyanide gas.

7. The method of claim 4 wherein the concentration and flow rate of polyvalent metal redox solution in the first mass transfer zone provides 90% or less of the stoichiometric quantity of polyvalent metal redox solution required for reaction with all of the $H_2S$ in the process gas.

8. The method of claim 4 wherein the solution is a catalytic ferric iron chelate solution that is reduced by hydrogen sulfide gas to a ferrous iron solution in said first mass transfer vessel.

9. The process of claim 4 wherein the polyvalent metal redox solution contains a vanadium salt, or a combination of chelated iron and vanadium.

10. The process of claim 1 wherein the liquid reagent solution contains an anthraquinone or an anthraquinone sulfonate.

11. The process of claim 1 wherein the liquid reagent solution contains a naphthaquinone or a naphthaquinone sulfonate.

12. The method of claim 1 including the step of introducing the liquid reagent from the second mass transfer vessel through an intermediate flow channel, wherein essentially no additional gas is dispersed, into the reaction chamber, said intermediate flow channel for retaining a continuous supply of the liquid reagent between the second mass transfer zone and the reaction chamber, and continuously flowing a portion of the liquid reagent from the reaction chamber to the second mass transfer zone at a controlled rate.

13. The method of claim 1 wherein the second mass transfer vessel includes a plurality of mass transfer stages in open liquid communication, one with another, and wherein the reaction chamber is in open liquid communication with the second mass transfer vessel including introducing the second gas into a first stage of the second mass transfer zone in contact with said liquid reagent; and thereafter contacting the liquid reagent received from the first stage of the second mass transfer vessel with the second gas in a second stage of the second mass transfer vessel.

14. A method of contacting a liquid reagent with different gases sequentially in separate mass transfer vessels, said mass transfer vessels operatively connected in liquid communication with each other comprising:
intimately contacting the liquid reagent with a process gas in a first mass transfer vessel, to effect mass transfer between said liquid reagent and said process gas, thereby forming a treated gas and a less active liquid reagent;
introducing the less active liquid reagent into a reaction chamber, said reaction chamber in fluid communication with said second mass transfer vessel;
flowing a portion of the less active liquid reagent from the reaction chamber to the second mass transfer vessel and flowing the remainder of the less active liquid reagent to the first mass transfer vessel;
introducing a second gas, different from said process gas, into said second mass transfer vessel in contact with less active liquid reagent, thereby effecting mass transfer between said less active liquid reagent and said second gas to form a more active liquid reagent; and
controlling the rate of flow of said more active liquid reagent from said second mass transfer vessel to the reaction chamber to control the amount of mass transfer in said second mass transfer vessel.

15. The method of claim 14 wherein the process gas includes a hydrogen sulfide gas contaminant and said liquid reagent is a reducible catalytic oxidation-reduction solution, thereby effecting reduction of the catalytic solution in said first mass transfer vessel to form a reduced catalytic solution and to effect oxidation of the hydrogen sulfide gas, and wherein the second gas is capable of oxidizing the reduced catalytic solution so that the oxidized catalytic solution is capable of further oxidation of the process gas in the first mass transfer vessel, to form elemental sulfur.

16. The method of claim 15 wherein the catalytic solution is a ferric iron chelate solution that is reduced by hydrogen-sulfide gas in said first mass transfer vessel to a ferrous iron solution.

17. A continuous process for intimate contact of a liquid reagent sequentially with first and second different gases in first and second separate mass transfer vessels, said second mass transfer vessel including a second mass transfer zone including one or more mass transfer stages serially arranged with an upper portion of one mass transfer stage in liquid communication with a lower portion of a succeeding mass transfer stage and a reaction chamber in liquid communication with said second mass transfer zone; said reaction chamber being in liquid flow communication with liquid reagent in the second transfer zone, such that liquid reagent introduced into the reaction chamber flows into the second mass transfer zone, for intimate contact with the second gas and flowing out of the second mass transfer zone through a liquid reagent outlet near an upper portion of said second mass transfer zone; introducing the first gas into a first mass transfer vessel, in liquid communication with the second mass transfer vessel, for intimate contact and mass transfer with said liquid reagent; introducing the second gas into said second mass transfer zone for intimate contact and mass transfer with said liquid reagent after said liquid reagent has been intimately contacted and mass transferred with the first gas in the first mass transfer vessel;
controlling the flow rate of said liquid reagent from said second mass transfer zone to said reaction chamber to effect continuous circulation of liquid reagent from the second mass transfer zone to the reaction chamber; and continuously flowing a portion of the liquid reagent from said second mass transfer zone into the reaction chamber and continuously flowing a portion of the liquid reagent from the reaction chamber into the second mass transfer zone, while flowing liquid reagent from the first mass transfer vessel to the reaction chamber and a portion of the liquid reagent from the second mass transfer vessel into the first mass transfer vessel for continuous recirculation of liquid and sequential intimate contact of said liquid reagent with said two gases.

18. The method of claim 17 wherein the process gas includes a hydrogen sulfide gas contaminant and said liquid reagent is a catalytic oxidation-reduction solution, thereby effecting oxidation of the hydrogen sulfide gas and reduction of the catalytic solution in the first transfer vessel; and wherein the second gas is capable of oxidizing the reduced catalytic solution to form an oxidized catalytic solution so that the oxidized catalytic solution is capable of further oxidation of the process gas in the first mass transfer vessel.

19. Apparatus for effecting mass transfer of a liquid reagent sequentially with two different gases in a separate mass transfer vessel for each gas, comprising:

a first mass transfer vessel for intimate contact and mass transfer between the liquid reagent and a first gas;

means for directing the liquid reagent and the first gas into the first mass transfer vessel to form a treated gas and a reacted liquid reagent;

a second mass transfer vessel including a plurality of mass transfer stages serially arranged with an upper end of one mass transfer stage in liquid communication with a lower end of a succeeding mass transfer stage through an intermediate flow channel wherein essentially no additional gas is dispersed in the liquid within the intermediate flow channel, and an integral reaction chamber, wherein essentially no additional gas is dispersed, in liquid communication with a first mass transfer stage;

means for directing the reacted liquid reagent from the first mass transfer vessel into the reaction chamber;

means for directing a portion of the liquid reagent from an upper portion of the reaction chamber into a lower portion of the first mass transfer stage of the second mass transfer vessel;

means for directing a second gas into each mass transfer stage of the second mass transfer vessel for intimate contact and mass transfer with the liquid reagent, said stages of said second mass transfer vessel disposed in a single mass transfer vessel including baffles separating the mass transfer stages, defining said intermediate flow channels, to prevent gas from the mass transfer stages of the second mass transfer vessel from contacting liquid reagent in the reaction chamber; and means operatively connected between the second mass transfer vessel and the reaction chamber thereof for controlling the flow rate of liquid reagent in the second mass transfer vessel between a last mass transfer stage and the reaction chamber, while maintaining continuous flow of liquid reagent between the first mass transfer vessel, reaction chamber, and the mass transfer stages of the second mass transfer vessel.

20. The apparatus of claim 19 wherein the baffles separating the reaction chamber and the first mass transfer stage of the second mass transfer vessel are two spaced, overlapping vertically baffles overlapping within the liquid reagent to allow liquid reagent flow between an upper portion of the reaction chamber and a lower portion of the first mass transfer stage of the second mass transfer vessel.

21. The apparatus of claim 20 further including a first conduit operatively connected between the reaction chamber and the first mass transfer vessel and a second conduit operatively connected between a mass transfer stage of said second mass transfer vessel and said first mass transfer vessel to provide liquid communication of said first mass transfer vessel with both the reaction chamber and the second mass transfer vessel, said conduits each including a valve adapted to adjust the flow of said liquid reagent from said second mass transfer vessel to said first mass transfer vessel and between a mass transfer stage of said second mass transfer vessel and said reaction chamber.

* * * * *